United States Patent [19]

McIntyre

[11] Patent Number: 4,485,084

[45] Date of Patent: Nov. 27, 1984

[54] HYDROGEN PEROXIDE PROCESS

[75] Inventor: William A. McIntyre, LaPorte, Tex.

[73] Assignee: FMC Corporation, Philadelphia, Pa.

[21] Appl. No.: 583,460

[22] Filed: Feb. 24, 1984

[51] Int. Cl.³ ............................................ C01B 15/02
[52] U.S. Cl. .................................................... 423/588
[58] Field of Search ......................... 423/588, 589, 590

[56] References Cited

U.S. PATENT DOCUMENTS

| | | | |
|---|---|---|---|
| 2,158,525 | 5/1939 | Riedl et al. | 23/207 |
| 2,886,416 | 5/1959 | Cox et al. | 23/207 |
| 2,902,347 | 9/1959 | Cosby et al. | 23/207 |
| 2,966,398 | 12/1960 | Jenney | 423/588 |
| 3,004,831 | 10/1961 | Hungerford et al. | 23/207 |
| 3,073,680 | 1/1963 | Jenney et al. | 23/207 |
| 3,112,278 | 11/1963 | Jenney et al. | 423/588 |
| 3,323,868 | 6/1967 | Ogilvie et al. | 23/207 |
| 3,635,841 | 1/1972 | Keith et al. | 252/466 |
| 3,752,885 | 8/1973 | Liebert et al. | 423/588 |
| 3,755,552 | 8/1973 | Lee et al. | 423/588 |

FOREIGN PATENT DOCUMENTS 677708  1/1964  Canada ................................ 423/588

OTHER PUBLICATIONS

Perry et al., "*Chemical Engineers Handbook*", Fifth Ed., McGraw-Hill, 1973, (N.Y.), pp. 24-30 to 24-36.
Winnaker-Küchler, *Chemische Technologie*, vol. II, Inorganic Technology I, 4th ed., pp. 568-579.
"Hydrogen Peroxide by Organic Process", *Chemistry and Industry*, Jan. 17, 1959, pp. 76 to 79.

*Primary Examiner*—John Doll
*Assistant Examiner*—Wayne A. Langel
*Attorney, Agent, or Firm*—Richard E. Elden; Eugene G. Horsky

[57] ABSTRACT

The invention provides a process to manufacture hydrogen peroxide by cyclically reducing, oxidizing, and extracting a working compound dissolved in an inert solvent, with solvent and/or energy from the effluent from the oxidation step being recovered thereby increasing the economically feasible temperature and pressure ranges of the oxidation step.

22 Claims, No Drawings

HYDROGEN PEROXIDE PROCESS

The invention provides a process to recover solvent from an effluent gas from the oxidizer employed in a hydrogen peroxide process, and to reduce the energy necessary to operate such process.

The process for manufacturing hydrogen peroxide by the cyclic reduction, oxidation, and extraction of a working solution containing an alkylated anthraquinone and its tetrahydro derivative is well known. The solution, generally known as the "working solution", is usually comprised of an inert solvent or mixture of solvents and an active compound or "working compound." The working compound comprises at least one alkylated anthraquinone, its 5,6,7,8-tetrahydro derivative and the corresponding hydroquinone derivatives. In the hydrogen peroxide process at least part of the working compound is reduced to the hydroquinone form, usually by catalytic hydrogenation. The working solution is subsequently oxidized, usually with air or oxygen, to reform the corresponding anthraquinone form of the working compound and to produce hydrogen peroxide. The working solution containing the oxidized working compound is extracted to remove the hydrogen peroxide and is cycled back to the reduction step. The organic hydrogen peroxide process is discussed in "Hydrogen Peroxide by Organic Process", *Chemistry and Industry*, Jan. 17, 1959, pages 76–79; Kirk-Othmer, *Encyclopedia of Chemical Technology*, Third Edition, Volume 13 (1973) pages 15–21; and Winnaker-Küchler, *Chemische Technologie*, Volume II, Inorganic Technology I, Fourth Edition, pages 568–572, all of which are incorporated herein in their entirety by reference.

The oxidation step is the subject a number of U.S. Patents; including U.S. Pat. No. 2,902,347 to Cosby et al; U.S. Pat. No. 3,073,680 to Jenny et al; U.S. Pat. No. 3,323,868 to Ogilvie et al; and U.S. Pat. No. 3,752,885 to Liebert et al, all of which are incorporated herein in their entirety by reference. These patents, together with the prior art as a whole, teach that the oxidation step as practiced is in need of improvement because of the large solvent loss in the effluent gas or off-gas and because of the high energy usage of the step. Both of these losses result in a high cost for the oxidation step.

Both the solvent loss and the energy loss increase when the working compound contains substantial quantities of the 5,6,7,8-tetrahydro compound. The Jenny et al '680 patent teaches that the tetrahydro derivative is more difficult to oxidize than the non-nuclearly hydrogenated anthrahydroquinone. Therefore, either a higher temperature is required in the oxidizing step, which increases the solvent loss, or a higher pressure is required, which increases the energy consumption of the oxidation step. The Liebert et al U.S. Pat. No. 3,752,885 teaches that a commercial process cannot avoid the buildup of the tetrahydro component of the working compound.

The Liebert et al U.S. Pat. No. 3,752,885 discloses that the prior art has long recognized the above problem. The process of the patent attempts to minimize the solvent loss and increase the oxidation efficiency through the use of a plurality of oxidizing vessels with a countercurrent flow of working solution and oxidizing gas between the oxidizing vessels and a cocurrent flow of the working solution and oxidizing gas within each oxidizing vessel. While the process provides a high efficiency based on oxygen, it requires a high pressure of the oxidizing gas to overcome the cumulative static and dynamic head encountered by the oxidizing gas in passing through the successive stages.

The Liebert U.S. Pat. No. 3,752,885 discloses the use of activated carbon to adsorb solvent from the effluent gas from the oxidizer in an attempt to minimize solvent loss. Although it is possible to recover solvent adsorbed onto an adsorbant, such as activated carbon, additional steps are required to do so. These additional steps increase the overall energy consumption because a hot gas is required to strip the solvent from the adsorbant.

In the present invention the effluent gas or off-gas from the oxidizing vessel is expanded so that most of the difference in energy content before and after expansion is converted into mechanical energy, thereby cooling the gas. Such expansion is commonly referred to as "isentropic expansion." As the effluent gas containing solvent is cooled below the dewpoint of the solvent during the isentropic expansion, condensation of solvent vapor can occur and the condensed liquid may be easily separated and collected. It is desirable for the temperature of the expanded gas to be reduced in temperature as low as possible to condense the maximum possible amount of solvent from the effluent gas. If water vapor is present in the effluent gas it is critical to prevent the formation of ice. Therefore, a desirable effluent temperature range is between 0° C. and 10° C. Preferably, the temperature range is between 1° C. and 5° C. However, temperature of less than 0° C. may be possible if the water vapor content of the effluent gas is sufficiently low to prevent the formation of ice.

In order to optimize the temperature of the effluent gas it is critical to adjust the heat content of the gas prior to the completion of expansion so that the temperature after expansion is within the desired range. The adjusting step may be conveniently accomplished by heating or cooling the gas before and/or during the expansion step or even by adding water vapor to the gas. If heating is required it is desired that the temperature be increased prior to expansion to permit maximum recovery of mechanical energy from the expansion step; it is preferable that the heat be supplied from a waste heat source, such as steam condensate or hot air, which is to be vented.

The isentropic expansion of the effluent gas from the oxidizer may be carried out by any convenient means, such as in a cylinder fitted with a piston. Desirably the expansion may be accomplished within a turbine. Preferably, the expansion may take place in a turboexpander or expansion turbine, such as disclosed by Perry, R. H., *Chemical Engineers' Handbook*, Fifth Edition, McGraw-Hill (1973) New York, pages 24–30 to 24–36. The application of turboexpanders to recover energy from high pressure natural gas or high temperature gases has been well known. However, there has been no suggestion in the prior art that the relatively low pressure, low temperature off-gas from an oxidizer in a hydrogen peroxide plant could be expanded isentropically to condense solvent.

The mechanical energy from the isentropic expansion may be absorbed by a brake mechanism, but is preferably converted to useful work, thereby decreasing the net energy requirement of the hydrogen peroxide process. The energy may be used to compress a gas, to pump a liquid, or preferably, may be used to turn an electric generator, thereby generating electric power.

Following the isentropic expansion, the effluent gas may be conventionally treated to remove any residual solvent, for example, by adsorption. However, because of the reduced solvent content in the effluent gas there is need for less adsorbent and, consequently, less energy is consumed in stripping solvent from the adsorbent than would otherwise be required.

From the above it will become clear to one skilled in the art that the process of the present invention will permit operating the oxidizing step of the hydrogen peroxide process at higher pressures and higher temperatures than were considered economic or desirable in the prior art process because of excessive solvent loss, excessive energy consumption, and/or excessive hydrogen peroxide decomposition.

Although the operating pressure of the oxidizer is not critical it is desirable for the pressure to be at least 275 kilopascals to provide a pressure difference of at least 175 kilopascals when the expanded gases are being discharged to the atmosphere. Although the oxidizer can operate above a pressure of 800 kilopascals, it is not usually desirable because the increased cost of operating at such pressure is not justified economically. The preferable economic operating pressure is between 400 and 600 kilopascals.

As the decomposition rate of the hydrogen peroxide increases rapidly with temperature, it is usually necessary to select the minimum and maximum operating temperature for the oxidizer to maximize the oxidizing reaction rate, yet minimize the decomposition rate of the hydrogen peroxide. The higher oxidizing pressures available and the higher operating temperatures possible with the present process result in more rapid oxidizing rates and therefore result in a lower overall loss of hydrogen peroxide through decomposition.

The maximum operating temperature of the oxidizer is usually determined by safety considerations, such as the flash point of the effluent gas. Although the optimum temperature range will vary depending on the specific plant conditions and equipment, it is usually desirable to maintain the temperature of the oxidizer between 35° C. and 65° C., and preferably, between 45° C. and 60° C.

The preferred method of operating the process of the present invention will become more apparent to one skilled in the art from the following example which is intended to teach one skilled in the art the best mode of practicing the invention and is not designed to limit the scope of the invention.

EXAMPLE

A simulated test was designed in which a turbine was operated using air at controlled inlet and effluent pressures and temperatures. The results of seven separate runs are indicated in Table I. Using Perry et al, pages 24-30 to 24-36, it was determined to be necessary to adjust the inlet temperature of a turboexpander to 82° C. to maintain the effluent temperature at 1.7° C. when the turbine is being operated at an inlet pressure of 432 kPa and an effluent pressure of 108 kPa.

Pursuant to the requirements of the patent statutes, the principle of this invention has been explained and exemplified in a manner so that it can be readily practiced by those skilled in the art, such exemplification, including what is considered to represent the best embodiment of the invention. However, it should be clearly understood that, with the scope of the appended claims, the invention may be practiced by those skilled in the art, and having the benefit of this disclosure, otherwise than as specifically described and exemplified herein.

TABLE I

| Run No. | RPM | Pressure kPa | | Temperature °C. | |
|---|---|---|---|---|---|
| | | Inlet | Effluent | Inlet | Effluent |
| 1 | 13100 | 170 | 107 | 62.5 | 18.3 |
| 2 | 13100 | 169 | 101 | 63.3 | 26.1 |
| 3 | 13100 | 156 | 101 | 62.2 | 30.3 |
| 4 | 13100 | 158 | 118 | 60.8 | 33.6 |
| 5 | 26000 | 212 | 105 | 59.4 | 17.8 |
| 6 | 26000 | 212 | 105 | 60.0 | 17.2 |
| 7 | 26000 | 214 | 105 | 59.4 | 15.6 |

Simulated Operating Test of Turboexpander

What is claimed is:

1. In the process of manufacturing hydrogen peroxide including the steps of reducing, oxidizing, and extracting a working compound selected from the group consisting of a substituted anthraquinone, the equivalent 5,6,7,8-tetrahydroanthraquinone, the anthrahydroquinone derivatives and mixtures thereof, the working compound being dissolved in an inert solvent to comprise a working solution, said oxidizing step comprising contacting the working solution from the reducing step with a gas containing oxygen at a pressure of at least 275 kilopascals thereby converting at least part of the hydroquinone form of the working compound to hydrogen peroxide and the corresponding anthraquinone form of the working compound, the improvement which comprises recovering solvent from effluent gas from said oxidizing step by:
    (a) adjusting the energy content of the effluent gas so that the temperature after step (b) is greater than the temperature at which ice crystals can be formed,
    (b) converting part of the energy content of the effluent gas from the oxidizing step into mechanical energy by causing the effluent gas to expand and be reduced in temperature below the dewpoint of the solvent thereby condensing solvent, and
    (c) collecting the condensed solvent.

2. The process of claim 1 wherein the temperature of the expanded gas in step (b) is between 0° C. and 10° C.

3. The process of claim 1 wherein the temperature of the expanded gas in step (b) is between 1° C. and 5° C.

4. The process of claim 1 wherein the adjusting of the energy content of the effluent gas in step (a) is by heating the gas before the completion of the expansion thereof.

5. The process of claim 2 wherein the adjusting of the energy content of the effluent gas in step (a) is by heating the gas before the completion of the expansion thereof.

6. The process of claim 3 wherein the adjusting of the energy content of the effluent gas in step (a) is by heating the gas before the completion of the expansion thereof.

7. The process of claim 1 wherein part of the energy content of the effluent gas is converted to mechanical energy by means of a turboexpander.

8. The process of claim 3 wherein part of the energy content of the effluent gas is converted to mechanical energy by means of a turboexpander.

9. A process for manufacturing hydrogen peroxide by the steps of reducing, oxidizing, and extracting a working compound selected from the group consisting of a substituted anthraquinone, the equivalent of 5,6,7,8-tetrahydroanthraquinone, their anthrahydroquinone derivatives and mixtures thereof, the working compound being dissolved in an inert solvent to comprise a working solution, said oxidizing step comprising:

(a) contacting working solution from the reducing step with a gas containing oxygen at a pressure of between 275 and 800 kilopascals and at a temperature of from 35° C. and 65° C. thereby converting a hydroquinone form of the working compound to hydrogen peroxide and the corresponding anthraquinone, (b) adjusting the energy content of the effluent gas from step (a) so that the temperature of the gas after expansion step (c) is between 0° C. and 10° C., (c) expanding the effluent gas from step (b) isentropically by converting part of the energy content of the gas into mechanical work, thereby cooling the expanded effluent gas to between 0° C. and 10° C. and condensing solvent therefrom, and (d) collecting the condensed solvent.

10. The process of claim 9 wherein the contacting step (a) is as a pressure of between 400 and 600 kilopascals and a temperature of between 45° C. and 60° C.

11. The process of claim 9 wherein the heat content of the effluent gas from step (a) is adjusted by means of heating the effluent gas prior to the completion of the expansion thereof.

12. The process of claim 10 wherein the heat content of the effluent gas from step (a) is adjusted by means of heating the effluent gas prior to the completion of the expansion thereof.

13. The process of claim 9 wherein the heat content of the effluent gas is adjusted so that the temperature of the expanded effluent gas is between 1° C. and 5° C.

14. The process of claim 10 wherein the heat content of the effluent gas is adjusted so that the temperature of the expanded effluent gas is between 1° C. and 5° C.

15. The process of claim 11 wherein the heat content of the effluent gas is adjusted so that the temperature of the expanded effluent gas is between 1° C. and 5° C.

16. The process of claim 12 wherein the heat content of the effluent gas is adjusted so that the temperature of the expanded effluent gas is between 1° C. and 5° C.

17. In the process of manufacturing hydrogen peroxide including the steps of reducing, oxidizing, and extracting a working compound selected from the group consisting of a substituted anthraquinone, the equivalent 5,6,7,8-tetrahydroanthraquinone, their anthrahydroquinone derivatives and mixtures thereof, the working compound being dissolved in an inert solvent to comprise a working solution, said oxidizing step comprising contacting the working solution from the reducing step with a gas containing oxygen at a pressure of at least 275 kilopascals thereby converting the hydroquinone form of the working compound to hydrogen peroxide and the corresponding anthrahydroquinone form of the working compound, the improvement which comprises recovering mechanical energy from the effluent gas from the oxidizer by:

(a) adjusting the energy content of the effluent gas so that the temperature of the effluent gas after expansion step (b) is between 0° C. and 10° C., and (b) converting part of the energy content of the adjusted gas from step (a) into mechanical energy by isentropically expanding the gas and thereby reducing the temperature of the gas to between 1° C. and 5° C.

18. The process of claim 17 wherein the step (b) of converting the part of the energy is by expanding the gas from step (a) in a turboexpander.

19. The process of claim 18 wherein mechanical energy from the turboexpander is converted into electrical energy.

20. The process of claim 17 wherein at least one liquid is condensed from the expanded gas of step (b) and separated therefrom.

21. The process of claim 18 wherein at least one liquid is condensed from the expanded gas of step (b) and separated therefrom.

22. The process of claim 19 wherein at least one liquid is condensed from the expanded gas of step (b) and separated therefrom.

* * * * *